US012209469B2

(12) United States Patent
Arsalan et al.

(10) Patent No.: US 12,209,469 B2
(45) Date of Patent: Jan. 28, 2025

(54) MUD TANK WITH SAFETY INTERLOCK

(71) Applicant: SAUDI ARABIAN OIL COMPANY, Dhahran (SA)

(72) Inventors: Ali Arsalan, Al Khubar (SA); Ahmad S. Alghamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 801 days.

(21) Appl. No.: 17/374,504

(22) Filed: Jul. 13, 2021

(65) Prior Publication Data

US 2023/0017475 A1 Jan. 19, 2023

(51) Int. Cl.
*E21B 21/01* (2006.01)
*B01F 21/20* (2022.01)
(Continued)

(52) U.S. Cl.
CPC .............. *E21B 21/01* (2013.01); *B01F 21/20* (2022.01); *B01F 35/605* (2022.01); *E21B 21/062* (2013.01)

(58) Field of Classification Search
CPC .. E04G 21/04; B28C 7/00; B28C 7/02; B28C 5/0875; B28C 9/04; B28C 7/0454; B28C 7/044; B28C 9/0454; B28C 7/0418; B28C 7/0422; B28C 7/0477; B28C 7/10; B28C 9/0481; B28C 9/049; B01F 15/0235; B01F 15/00538; B01F 15/00519; B01F 2215/0081; B01F 35/71731; B01F 35/32025; B01F 35/3204; B01F 2101/49; B01F 33/805; B01F 35/71775; B01F 33/823; B01F 35/711; B01F 35/754; B01F 35/7176; B01F 27/112; B01F 33/5023; B01F 25/53; B01F 21/20; B01F 35/605; F01D 15/08; F01D 15/10; F02C 3/22; F04B 49/20; F04B 19/22; F04B 17/03; F04B 17/06; F04B 23/00; F04B 47/02; F04B 49/065; H02P 23/00; E21B 43/267;
(Continued)

(56) References Cited

U.S. PATENT DOCUMENTS 3,953,226 A 4/1976 Emond et al.
4,474,254 A * 10/1984 Etter ........................ E21B 21/06
366/136

(Continued)

FOREIGN PATENT DOCUMENTS

CA 2352619 A1 1/2003
CN 203916163 U 11/2014

(Continued)

*Primary Examiner* — Charles Cooley
(74) *Attorney, Agent, or Firm* — Osha Bergman Watanabe & Burton LLP

(57) ABSTRACT

A fluid storage system includes a receptacle, configured to store a fluid, delimited by a sidewall and a bottom surface wherein the bottom surface has a degree of slope directing the bottom surface to an orifice. The system further includes an inlet pipe configured to transport the fluid from an oil rig to the receptacle, an outlet pipe configured to transport the fluid from the receptacle to the oil rig, an agitator having a shaft and a propeller, a jetting line equipped with a nozzle configured to release a jetting fluid towards the sidewall and the bottom surface of the receptacle, and an interlock switch configured to automatically shut off the agitator and the jetting line.

18 Claims, 4 Drawing Sheets

(51) Int. Cl.
*B01F 35/60* (2022.01)
*E21B 21/06* (2006.01)

(58) Field of Classification Search
CPC ...... E21B 43/26; E21B 43/2607; E21B 21/01; E21B 21/062; B65G 33/18; B65G 47/19; Y02P 70/10; B08B 9/0933
USPC .... 366/14–20, 27–29, 33–35, 64–66, 37–38, 366/31–32, 50–51, 41, 155.1–158.4
See application file for complete search history.

(56) References Cited

U.S. PATENT DOCUMENTS

| | | | | |
|---|---|---|---|---|
| 5,087,294 | A | 2/1992 | Rechtzigel | |
| 5,533,806 | A * | 7/1996 | Veltrop | B01F 27/805 366/206 |
| 5,944,418 | A | 8/1999 | Orr et al. | |
| 7,686,966 | B2 | 3/2010 | Eriksen | |
| 9,447,313 | B2 * | 9/2016 | Weinstein | B01F 23/59 |
| 2014/0364344 | A1 * | 12/2014 | Weinstein | B01F 25/50 422/292 |
| 2022/0250012 | A1 * | 8/2022 | Webb | B01F 35/754 |
| 2023/0017475 | A1 * | 1/2023 | Arsalan | E21B 21/062 |
| 2023/0077174 | A1 * | 3/2023 | Couch | B01F 25/104 |

FOREIGN PATENT DOCUMENTS

| | | | |
|---|---|---|---|
| CN | 208980553 | U | 6/2019 |
| KR | 100801856 | B1 | 2/2008 |

* cited by examiner

MUD TANK WITH SAFETY INTERLOCK

BACKGROUND

In the petroleum industry, hydrocarbons are extracted from hydrocarbon reservoirs located far beneath the Earth's surface. Hydrocarbons are extracted by drilling wells, having a wellbore, using an oil rig. Wellbores are drilled, in part, by using drilling mud. Drilling mud is a fluid that may be designed in many ways to provide certain functions while drilling a wellbore. Drilling mud is used to provide hydrostatic pressure, keep the drill bit cooled and lubricated, suspend cuttings in the wellbore, and circulate cuttings out of the wellbore. The mud (or fluid) system of an oil rig is considered a closed system, meaning that the drilling mud is re-used. The drilling mud is commonly transported in/out of and stored within various mud tanks on the oil rig. Commonly, an oil rig has mud storage tanks, mud mixing tanks, and mud circulation tanks. An oil rig may also have other tanks for storage of fluids such as water tanks and chemical tanks.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a fluid storage system and method for use of the fluid storage system. In one embodiment, the fluid storage system includes a receptacle, configured to store a fluid, delimited by a sidewall and a bottom surface wherein the bottom surface has a degree of slope directing the bottom surface to an orifice. The system further includes an inlet pipe configured to transport the fluid from an oil rig to the receptacle, an outlet pipe configured to transport the fluid from the receptacle to the oil rig, an agitator having a shaft and a propeller, a jetting line equipped with a nozzle configured to release a jetting fluid towards the sidewall and the bottom surface of the receptacle, and an interlock switch configured to automatically shut off the agitator and the jetting line.

In other embodiments, the method for use of the fluid storage system includes transporting fluid, using an inlet pipe, from an oil rig to a receptacle configured to store the fluid, wherein the receptacle is delimited by a sidewall and a bottom surface, and the bottom surface has a degree of slope directing the bottom surface to an orifice, transporting fluid, using an outlet pipe, from the receptacle to the oil rig, agitating the fluid, stored in the receptacle, with an agitator having a shaft and a propeller, wherein the propeller is configured to direct the fluid to the bottom surface, draining the fluid from the receptacle through the orifice, releasing a jetting fluid, from a nozzle fixed to a jetting line, towards the sidewall and the bottom surface of the receptacle, and shutting off the agitator and jetting line using an interlock switch.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
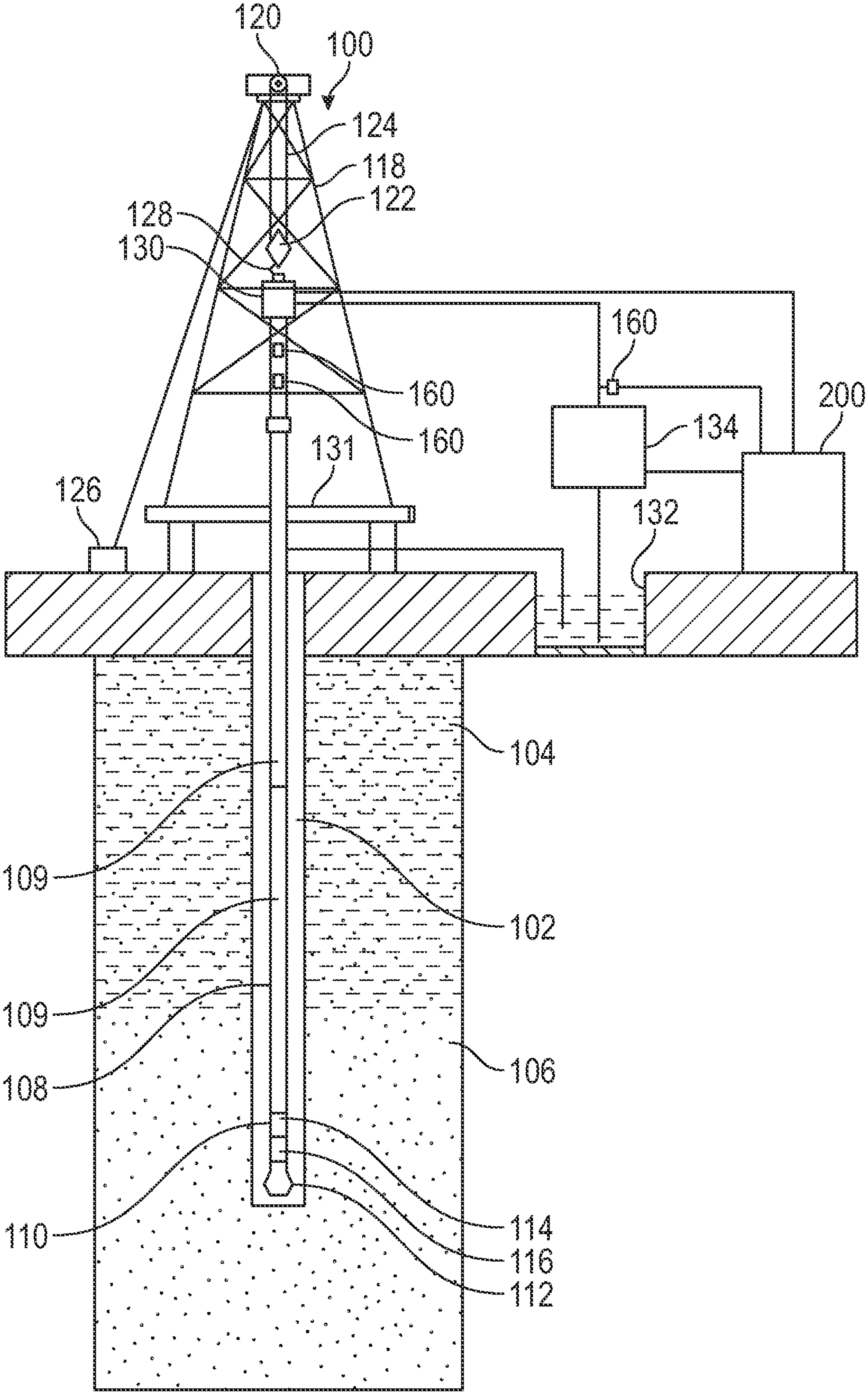
FIG. 1 is a schematic diagram of an exemplary oil rig in accordance with one or more embodiments.

FIG. 1 illustrates an exemplary oil rig (100). In general, oil rigs may be configured in a myriad of ways. Therefore, oil rig (100) is not intended to be limiting with respect to the particular configuration of the drilling equipment. The oil rig (100) is depicted as being on land. In other examples, the oil rig (100) may be offshore, and drilling may be carried out with or without use of a marine riser. A drilling operation at the oil rig (100) may include drilling a wellbore (102) into a subsurface including various formations (104, 106). For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that can be used to adjust the length of the cable (124) so that the traveling block (122) may move up or down the derrick (118). The traveling block (122) may include a hook (128) on which a top drive (130) is supported. The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called drilling mud, herein called "mud,") may be stored in a mud tank (132), and at least one pump (134) may pump the mud from the mud tank (132) into the drill string (108). The mud may flow into the drill string (108) through appropriate flow paths in the top drive (130) (or a rotary swivel, if a rotary table is used instead of a top drive to rotate the drill string (108)).

In one implementation, a system (200) may be disposed at or communicate with the oil rig (100). System (200) may control at least a portion of a drilling operation at the oil rig (100) by providing controls to various components of the drilling operation. In one or more embodiments, system (200) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation). Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the oil rig (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108). The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (200).

The current design of mud tanks (132) include sidewalls and a flat bottom surface. The flat bottom surface prevents the mud from adequately draining from the mud tank (132) leaving mud cake behind. Further, mud tanks (132) require an entrant to enter the tank (132) in order to clean off the mud cake and other mud residuals. This is done by performing scraping or jet washing operations. These activities are time consuming and can expose the entrant to confined space and machinery risk. Thus, a fluid tank design which allows for enhanced drainage of fluid, improved cleaning operations, and mitigations put in place for hazardous operations is beneficial. As such, embodiments herein are related to an enhanced fluid storage system that allows for gravity drainage of fluid, autonomous cleaning operations, and mitigation of hazards using in-place safety mechanisms.

Figure 2:
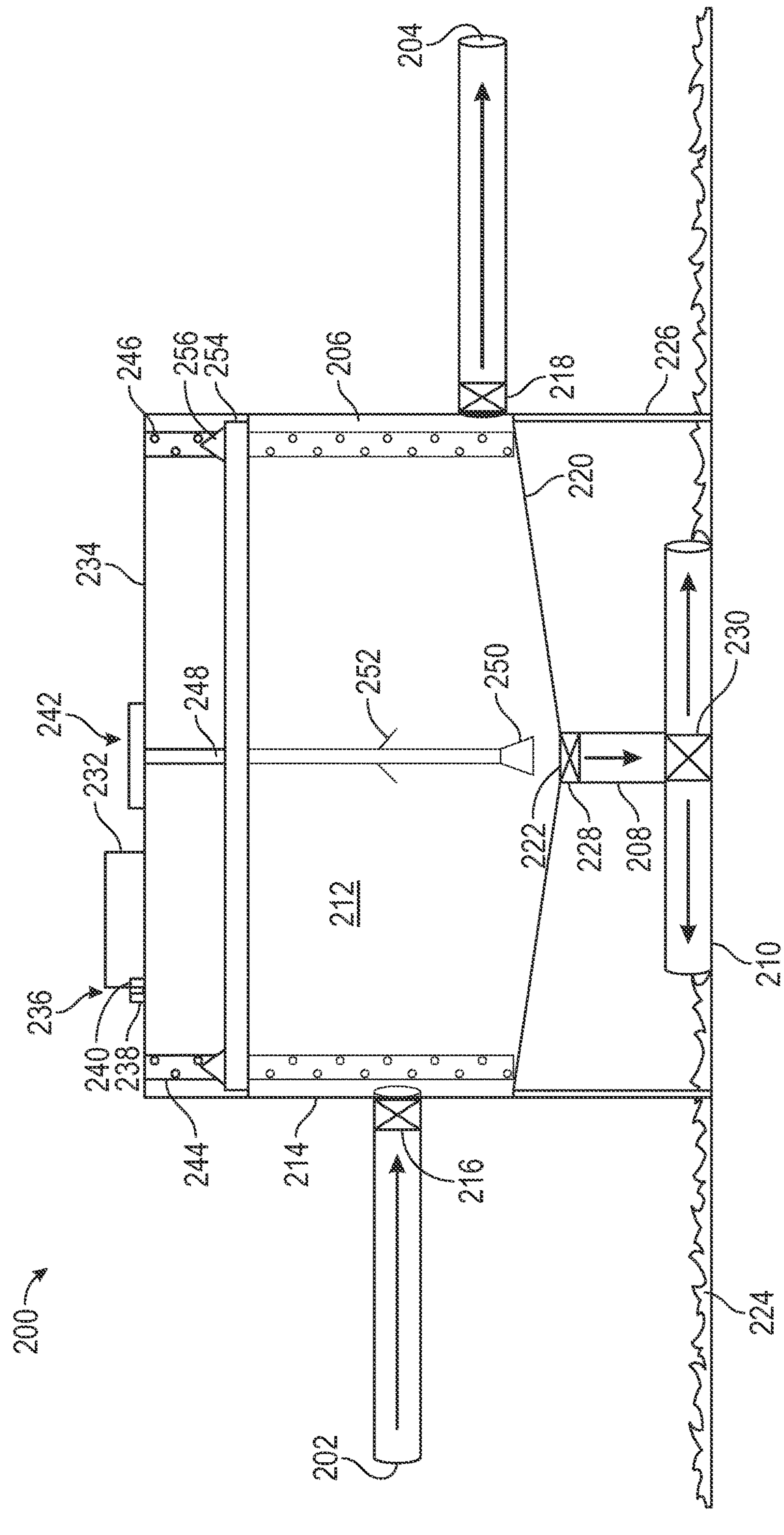
FIG. 2 is a schematic diagram of a fluid storage system in accordance with one or more embodiments.

FIG. 2 depicts a fluid storage system (200) that may be used to aid in drilling operations on an oil rig (100). The fluid storage system (200) is made of an inlet pipe (202), an outlet pipe (204), a receptacle (206), a tank dumping pipe (208), and a main dumping pipe (210). The inlet pipe (202) and the outlet pipe (204) are pieces of pipe that are configured to transport a fluid (212). The fluid (212) may be any type of fluid (212) such as water, drilling mud, chemicals etc. The inlet pipe (202) and the outlet pipe (204) may be of any diameter and be made of any material that is suitable for the operation, such as steel.

The inlet pipe (202) transports the fluid (212) from an outside source to the receptacle (206). The outlet pipe (204) transports the fluid (212) from the receptacle (206) to either the same or a different outside source. The inlet pipe (202) and the outlet pipe (204) may be connected to the receptacle (206) by any means known in the art such as welding or using a bolted flange connection. Further, the inlet pipe (202) and the outlet pipe are depicted as being connected to the sidewall (214) of the receptacle; however, they may be connected to the receptacle (206) at any location. The inlet pipe (202) may have an inlet valve (216) that controls the flow of fluid (212) into the receptacle (206) from the inlet pipe (202). The inlet valve (216) may be controlled manually or electronically, and the inlet valve (216) may be any type of valve known in the art such as a gate valve.

The outlet pipe (204) may have an outlet valve (218) that controls the flow of fluid (212) from the receptacle (206) to the outlet pipe (204). The outlet valve (218) may be controlled manually or electronically, and the outlet valve (218) may be any type of valve known in the art such as a gate valve. In one or more embodiments, the fluid (212) being transported may be drilling mud, and the mud may be transported to and from the oil rig (100). For example, the mud may be transported from the receptacle (206), through the outlet pipe (204), down the top drive (130), through the drill string (108), out the drill bit (112), into an annulus of the wellbore (102), up the annulus, through return pipes, over shale shakers, to the inlet pipe (202), and back into the receptacle (206).

The receptacle (206) is configured to store the fluid (212) and is delimited by at least one sidewall (214) and a bottom surface (220). The bottom surface (220) has a degree of slope directing the bottom surface (220) towards an orifice (222). The slope may exist on all sides of the bottom surface (220) to assist in fluid (212) drainage towards the orifice (222). The receptacle (206) may have any number of sidewalls (214) of any shape along with a bottom surface (220) of any shape. For example, the receptacle (206) may have a singular sidewall (214) forming the receptacle (206) into a cylindrical shape, in this case the bottom surface (220) may be formed in a circular or ovular shape. In other embodiments, the receptacle (206) may have four sidewalls (214) forming the receptacle (206) into a rectangular or cubed shape, and the bottom surface (220) may be a square or a rectangle.

The sidewall(s) (214) and the bottom surface (220) may be made of any material that may be suitable for the operation, such as steel. Further, the sidewall(s) (214) and the bottom surface (220) may be of any dimension. The receptacle (206) may be elevated off of a surface (224) using at least one leg (226). The leg(s) (226) may be made of any material and be of any shape as long as the leg(s) (226) are able to hold the weight of the receptacle (206) off of the surface (224). The surface (224) may be any location outside of the wellbore (102), such as the Earth's surface. The leg(s), sidewall (214), and bottom surface (220) may be fixed together using any means known in the art such as welding. The orifice (222) is an opening to a tank dumping pipe (208). The orifice (222) may be open or closed using a drain valve (228), i.e., the drain valve (228) is able to control the movement of the fluid (212) from the receptacle (206) to the orifice (222). The drain valve (228) may be controlled mechanically or electronically. Further, the drain valve (228) may be any valve known in the art such as a gate valve, and the drain valve (228) may be controlled using a hand wheel.

The tank dumping pipe (208) is connected to the main dumping pipe (210). The main dumping pipe (210) may deliver the fluid (212) to any number of locations such as axillary tankers for offsite disposal of the fluid (212) or a waste pit. The direction of fluid (212) flow within the main dumping pipe (210), as well as control of fluid (212) from the tank dumping pipe (208) to the main dumping pipe (210), may be controlled by a directional control valve (230). The directional control valve may be controlled mechanically or electronically. Further, the directional control valve (230) may be any valve known in the art such as a three-way ball valve. The tank dumping pipe (208) and the main dumping pipe (210) are pieces of pipe that are configured to transport the fluid (212). They may be of any diameter and made of any material that is suitable for the operation such as steel. The tank dumping pipe (208) may be connected to the main dumping pipe (210) by any means known in the art such as welding or using bolted flanges.

The receptacle (206) may have an access hatch (232) that may be opened to gain access to the interior of the receptacle (206). The access hatch (232) is depicted as being located on a top surface (234) of the receptacle (206); however, the access hatch (232) may be located anywhere on the receptacle (206) such as on a sidewall (214) or on the bottom surface (220). If the access hatch (232) is located at an elevated surface, then a ladder may be connected to the receptacle (206) to access the access hatch (232). The access hatch (232) has an interlock switch (236) configured to automatically shut off an agitator (242) and jetting line (244) located within the receptacle (206).

The interlock switch (236) may be made of two sensors: a first sensor (238) and a second sensor (240). The first sensor (238) and the second sensor (240) may sense alignment with each other without the need for physical contact. The two sensors may continuously communicate, and, when they are moved apart from each other, they will disconnect an electrical circuit that is powering the agitator (242) and jetting line (244). The first sensor (238) may be fixed to the receptacle (206) and the second sensor (240) may be fixed to the access hatch (232) such that, when the access hatch (232) is opened, the two sensors are moved apart from one another, and the electrical circuit is disconnected. This means that, if any entrant enters the receptacle (206), the interlock switch (236) provides a failsafe that will turn off the agitator (242) and the jetting line (244), and not allow them to be turned back on, to protect the entrant from injuries caused by moving machinery.

The jetting line (244) is a pipe configured to transport a jetting fluid, such as water. The jetting line (244) is installed within the receptacle (206). There may be more than one jetting line (244), such as depicted in FIG. 2. The jetting line (244) has at least one nozzle (246) that allows the jetting fluid to exit the jetting line (244). The nozzle (246) may be designed in such a way that it allows the jetting fluid to exit the jetting line (244) at a high pressure and directed at a certain angle. The jetting lines (244) depicted in FIG. 2 are installed along the sides of the sidewall (214) and have a plurality of nozzles (246) pointed in various directions to ensure efficient cleaning of the receptacle (206).

The nozzles (246) may be directed to release the jetting fluid towards the sidewall (214) and the bottom surface (220) of the receptacle (206). The jetting fluid may be used to clean off the fluid (212) residuals left in the receptacle (206), such as mud residuals or mud cake, when the fluid (212) has been drained from the receptacle (206) into the tank dumping pipe (208). Hot water may be used as the jetting fluid to help remove oil-based mud from the receptacle (206). The jetting line (244) may allow for complete autonomous cleaning of the receptacle (206) without having to have an entrant enter the receptacle (206), thus removing the confined space hazard.

The agitator (242) is made of a shaft (248) and a propeller (250). The shaft (248) connects the propeller (250) to the top surface (234) of the receptacle (206). The shaft (248) may be used to rotate the propeller (250) to mix the fluid (212) in the receptacle (206). The propeller (250) may be formed in a cone shape to aid in directing the movement of the fluid (212) towards the bottom surface (220). This allows for the heavier particles, that tend to settle to the bottom surface (220), to mix into the fluid (212) at a more efficient rate. The agitator (242) may also have mixing arms (252) connected to the shaft (248), at various locations, to aid in the mixing of the fluid (212). The receptacle (206) may also have a floating roof (254) that is configured to float atop the fluid (212) stored in the receptacle (206). The floating roof (254) may be made of any buoyant material such as carbon fiber. Carbon fiber allows the floating roof (254) to be strong, light weight, low density, highly buoyant, non-corrosive, and heat resistant.

The floating roof (254) may be used as a safeguard against an entrant falling into the fluid (212). If an entrant falls into the receptacle (206), while the receptacle has fluid (212), then the entrant will fall on top of the floating roof (254) rather than into the fluid (212). The floating roof (254) may have at least one first opening and a second opening which are holes that allow the jetting line (244) and the agitator (242) shaft (248) to be transfixed, respectively. The floating roof (254) may float up and down as the fluid (212) enters and exits the receptacle (206). The floating roof (254) may be guided and stabilized by the jetting line (244) and the agitator (242) shaft (248). A fluid marker (256) may be fixed to the jetting line (244) and be configured to rest on the floating roof (254). The fluid marker (256) may move with the floating roof (254) and be used as a visual indicator of the level of the fluid (212) in the receptacle (206). The fluid marker (256) may be made of any low-density high buoyancy materials such as polymers, polyethylene, or carbon fiber.

Figure 3:
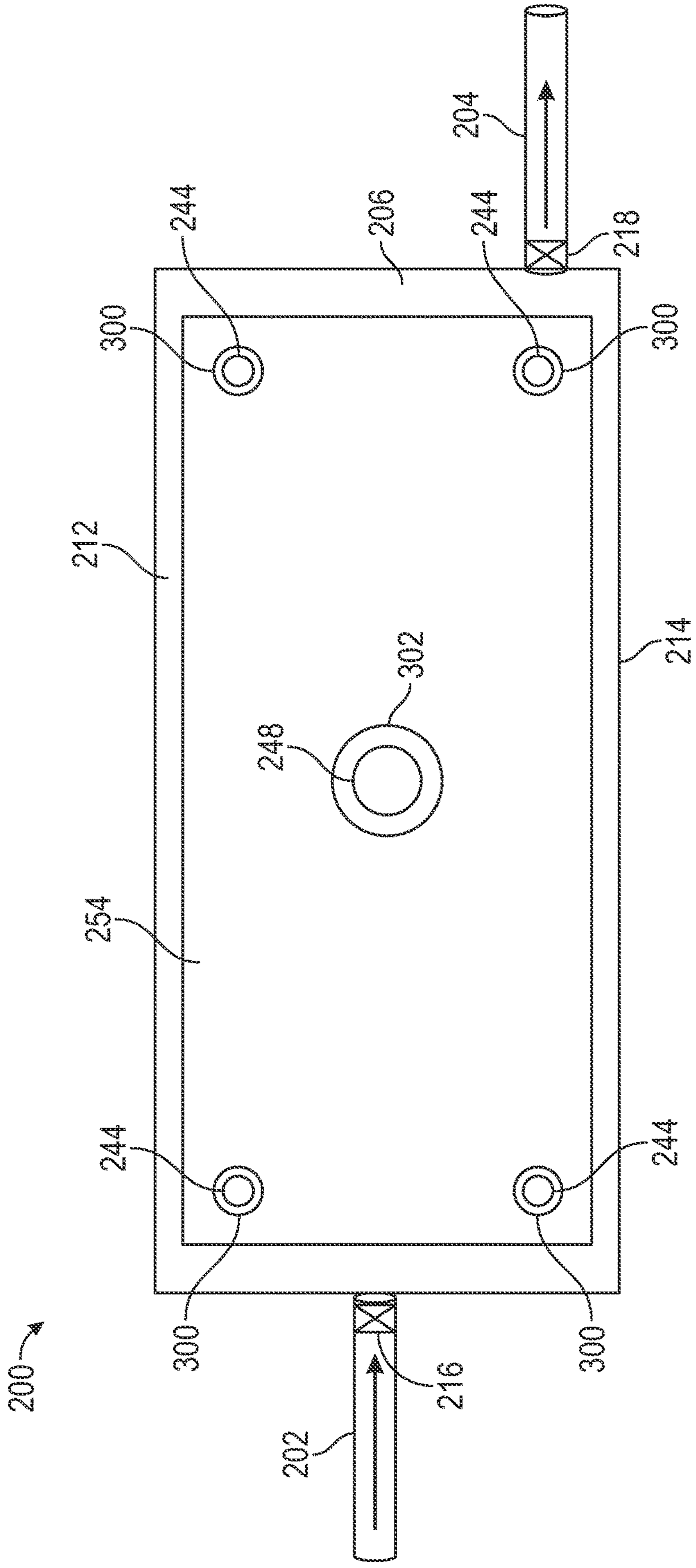
FIG. 3 is a schematic diagram of the fluid storage system in accordance with one or more embodiments.

FIG. 3 depicts a different view of the fluid storage system (200) depicted in FIG. 2. Components that are similar to those depicted in FIG. 2 have not been redescribed for purposes of readability and have the same functions as described above. The fluid storage system (200) of FIG. 3 shows the receptacle (206) having four sidewalls (214) formed in a rectangular shape containing a fluid (212). The floating roof (254) is shown floating on the fluid (212) and having four first openings (300) and one second opening (302). The first opening (300) is a hole in the floating roof (254) that allows the jetting line (244) to protrude through. The second opening (302) is a hole that allows the agitator (242) shaft (248) to protrude through. The four first openings (300) may be disposed within the four corners of the receptacle (206) with the second opening (302) being disposed within the center of the receptacle (206).

As can be seen from the figure, the jetting line (244) and the agitator (242) shaft (248) are not fixed to the floating roof (254), they are freestanding within the first opening (300) and the second opening (302), respectively. This allows for the floating roof (254) to move up and down as the fluid (212) fills and empties from the receptacle (206). Fluid (212) may enter the receptacle (206) through the inlet pipe (202), and the flow of fluid (212) may be controlled using the inlet valve (216). Fluid (212) may exit the receptacle (206) through the outlet pipe (204), and the flow of fluid (212) may be controlled using the outlet valve (218). The fluid (212) may exit the receptacle (206) by being drained from the receptacle (206) using the drain valve (228) and the tank dumping pipe (208).

In one or more embodiments, the fluid (212) in the receptacle (206) may be drilling mud, and the fluid storage system (200) may be used in a drilling operation in any manner such as storage, mixing, or circulating. In further embodiments, the fluid (212) in the receptacle (206) may be chemicals, water, completion fluid, or production fluid and may be used in any operations associated with the petroleum industry such as fracturing, workover operations, or other completion operations.

Figure 4:
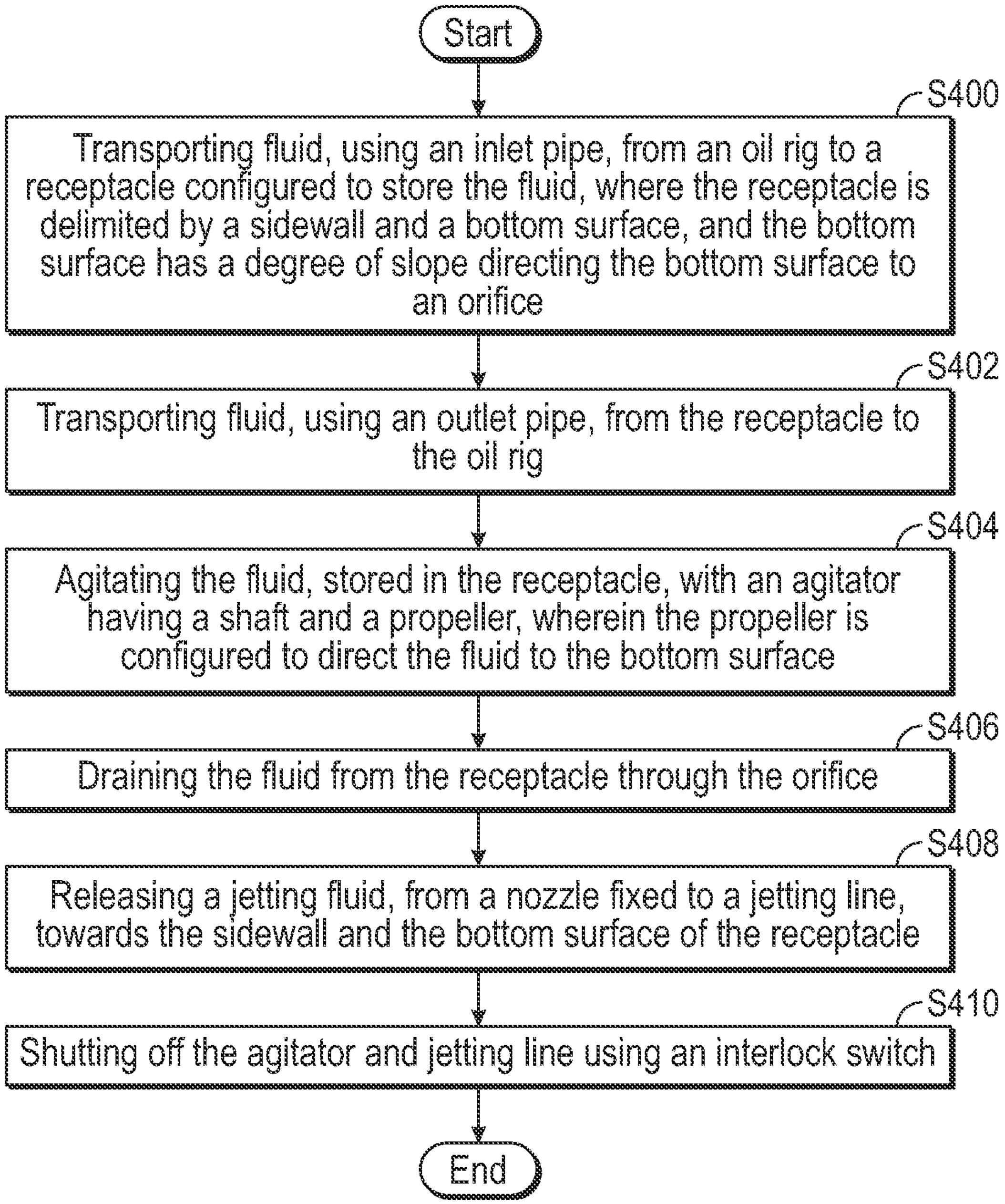
FIG. 4 shows a flowchart in accordance with one or more embodiments.

FIG. 4 depicts a flowchart in accordance with one or more embodiments. More specifically, FIG. 4 illustrates a method for operating a fluid storage system (200). Further, one or more blocks in FIG. 4 may be performed by one or more components as described in FIGS. 1-3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a fluid (212) is transported, using an inlet pipe (202), from an oil rig (100) to a receptacle (206). The receptacle (206) is configured to store the fluid (212), and the receptacle (206) is delimited by a sidewall (214) and a bottom surface (220). The bottom surface (220) has a degree of slope directing the bottom surface (220) to an orifice (222) (S400). The fluid may be any fluid, such as drilling mud. The drilling mud may be transported from any equipment on the oil rig (100) such as a standpipe, return lines, other storage tanks, etc. The flow of fluid (212) from the inlet pipe (202) to the receptacle (206) may be controlled using an inlet valve (216). The receptacle (206) may have any number of sidewalls (214) forming any shape.

The fluid (212) is transported out of the receptacle (206), to the oil rig (100), using an outlet pipe (204) (S402). The fluid (212) may be transported to any equipment on the oil rig (100), such as a standpipe, a top drive (130), a drill string (108), etc. The flow of fluid (212) from the receptacle (206) to the outlet pipe (204) may be controlled by an outlet valve (218). The fluid (212), when stored in the receptacle (206), may be agitated by an agitator (242) having a shaft (248) and a propeller (250). The propeller (250) is configured to direct the fluid to the bottom surface (220) (S404). The agitator (242) may also have a mixing arm (252) disposed along the shaft (248) that aids in the mixing of the fluid (212). The propeller (250) may be cone-shaped in order to help direct the fluid (212) to the bottom surface (220) of the receptacle (206).

The receptacle (206) may have a floating roof (254) with a first opening (300) and a second opening (302) through which a jetting line (244) and the agitator (242) shaft (248) are transfixed, respectively. A fluid marker (256) may be fixed to the jetting line (244) to identify a fluid (212) level within the receptacle (206). The fluid marker (256) rests on the floating roof (254) and moves up and down as the floating roof (254) moves as the volume of fluid (212) in the receptacle (206) changes.

The fluid (212) is drained from the receptacle (206) through the orifice (222) (S406). The orifice (222) may be an opening to a tank dumping pipe (208). The flow of fluid (212) to the tank dumping pipe (208) is controlled by a drain valve (228). The tank dumping pipe (208) may be connected to a main dumping pipe (210) that may transport the fluid (212) to disposal sites or disposal trucks. When the fluid (212) has been drained from the receptacle (206), a jetting fluid may be released from a nozzle (246) fixed to a jetting line (244) and be directed towards the sidewall (214) and the bottom surface (220) of the receptacle (206) (S408). There may be more than one jetting line (244), such as the four jetting lines (244) depicted in FIG. 3. Each jetting line (244) may have a plurality of nozzles (246) pointing in different directions to ensure all surfaces of the receptacle (206) are cleaned by the jetting fluid.

The agitator (242) and jetting line (244) are shut off using an interlock switch (S410). The interlock switch (236) may be made of a first sensor (238), fixed to the receptacle (206), and a second sensor (240), fixed to an access hatch (232). When the first sensor (238) and the second sensor (240) sense misalignment from each other, caused by the access hatch (232) being opened, the interlock switch (236) breaks the electrical circuit powering the agitator (242) and the jetting line (244), thus turning off the agitator (242) and jetting line (244). Further, as long as the access hatch remains open, and the interlock switch has no communication between the two sensors, neither the agitator (242) nor the jetting line (244) may be turned on until the first sensor (238) and the second sensor (240) sense they are in alignment with each other, i.e., the access hatch (232) is closed.

In other embodiments, the fluid storage system (200) may be automated using various sensors, computer processors, and electronic valves. For example, the inlet valve (216), the outlet valve (218), the drain valve (228), and the directional control valve (230) may all be electronically controlled. The receptacle (206) may have sensors on the inside of the receptacle (206). The sensors may send communication, wirelessly or through cables, to the computer processor related to the levels of fluid (212) within the receptacle (206). The computer processor may be programmed to sense when the fluid (212) in the receptacle (206) reaches a pre-determined height.

When the fluid (212) reaches said height, the inlet valve (216) may be automatically closed and the outlet valve (218) may be automatically opened, thus preventing any more fluid (212) from entering the receptacle (206) and expelling a volume of fluid (212) from the receptacle (206). Further, the computer processor may be programmed to close the inlet valve (216), open the drain valve (228), and open the directional control valve (230) to drain the receptacle (206) of all fluid (212) when a particular operation has been completed. The sensors in the receptacle (206) may sense when the receptacle (206) has been drained of all fluid (212), and the jetting line (244) may automatically be turned on to clean the receptacle (206).

Those skilled in the art will appreciate that although embodiments disclosed above relate the fluid storage system (200) to drilling operations, the fluid storage system (200) may be used in any capacity where fluid (212) storage and tank cleaning are required without departing from the scope of this disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A fluid storage system comprising:

a receptacle, configured to store a fluid, delimited by a sidewall and a bottom surface wherein the bottom surface has a degree of slope directing the bottom surface to an orifice;

an access hatch mounted onto the receptacle;

an inlet pipe configured to transport the fluid from an oil rig to the receptacle;

an outlet pipe configured to transport the fluid from the receptacle to the oil rig;

an agitator having a shaft and a propeller;

a jetting line equipped with a nozzle configured to release a jetting fluid towards the sidewall and the bottom surface of the receptacle; and an interlock switch, comprising a first sensor fixed to the receptacle and a second sensor fixed to the access hatch, configured to automatically shut off the agitator and the jetting line, wherein the first sensor and the second sensor sense the access hatch is closed when the first sensor and the second sensor are aligned with one another and the first sensor and the second sensor sense the access hatch is opened when the first sensor and the second sensor are misaligned with one another, and wherein the interlock switch breaks an electrical circuit powering the agitator and the jetting line when the first sensor and the second sensor detect the access hatch is opened.

2. The fluid storage system of claim 1, further comprising:

a floating roof, having a first opening and a second opening, configured to float atop the fluid stored in the receptacle.

3. The fluid storage system of claim 2, wherein the first opening is a hole through which the jetting line is transfixed.

4. The fluid storage system of claim 3, further comprising:

a fluid marker, movably connected to the jetting line, configured to rest on the floating roof and move with the floating roof.

5. The fluid storage system of claim 2, wherein the second opening is a hole through which the shaft of the agitator is transfixed.

6. The fluid storage system of claim 1, wherein the propeller is cone-shaped and configured to direct the fluid towards the bottom surface.

7. The fluid storage system of claim 1, wherein the agitator further comprises at least one mixing arm disposed along the shaft.

8. The fluid storage system of claim 1, wherein the fluid comprises drilling mud.

9. The fluid storage system of claim 1, further comprising:

a drain valve configured to control fluid movement from the receptacle to the orifice.

10. A method comprising:

transporting fluid, using an inlet pipe, from an oil rig to a receptacle configured to store the fluid, wherein the receptacle is delimited by a sidewall and a bottom surface, and the bottom surface has a degree of slope directing the bottom surface to an orifice;

transporting fluid, using an outlet pipe, from the receptacle to the oil rig;

agitating the fluid, stored in the receptacle, with an agitator having a shaft and a propeller, wherein the propeller is configured to direct the fluid to the bottom surface;

draining the fluid from the receptacle through the orifice;

releasing a jetting fluid, from a nozzle fixed to a jetting line, towards the sidewall and the bottom surface of the receptacle;

opening an access hatch mounted onto the receptacle; and shutting off the agitator and jetting line using an interlock switch comprising a first sensor fixed to the receptacle and a second sensor fixed to the access hatch, wherein the first sensor and the second sensor sense the access hatch is closed when the first sensor and the second sensor are aligned with one another and the first sensor and the second sensor sense the access hatch is opened when the first sensor and the second sensor are misaligned with one another, and wherein the interlock switch breaks an electrical circuit powering the agitator and the jetting line when the first sensor and the second sensor detect the access hatch is opened.

11. The method of claim 10, further comprising:

suspending a floating roof, having a first opening and a second opening, atop the fluid in the receptacle.

12. The method of claim 11, wherein the first opening is a hole through which the jetting line is transfixed.

13. The method of claim 12, further comprising:

identifying a fluid level in the receptacle using a fluid marker, movably connected to the jetting line, configured to rest on the floating roof and move with the floating roof.

14. The method of claim 11, wherein the second opening is a hole through which the shaft of the agitator is transfixed.

15. The method of claim 10, wherein the propeller is cone-shaped and configured to direct the fluid towards the bottom surface.

16. The method of claim 10, wherein the agitator further comprises at least one mixing arm disposed along the shaft.

17. The method of claim 10, wherein the fluid comprises drilling mud.

18. The method of claim 10, wherein draining the fluid from the receptacle through the orifice is controlled by a drain valve.

* * * * *